United States Patent [19]

Sens et al.

[11] Patent Number: 5,045,373

[45] Date of Patent: Sep. 3, 1991

[54] LAMINATED PRODUCT, COMPOUND USED IN THE LAMINATED PRODUCT AND OPTICAL INFORMATION CARRIER PROVIDED WITH THE LAMINATED PRODUCT

[75] Inventors: Martinus M. Sens, Eindhoven; Theodorus C. J. M. Bertens, Bladel; Hendricus F. J. J. Van Tongeren, Waalre; Johannes T. H. Thijssen, Eindhoven, all of Netherlands

[73] Assignee: U.S. Philips Corporation, New York, N.Y.

[21] Appl. No.: 481,669

[22] Filed: Feb. 14, 1990

Related U.S. Application Data

[63] Continuation of Ser. No. 283,415, Dec. 12, 1988, abandoned.

[30] Foreign Application Priority Data

Apr. 13, 1988 [NL] Netherlands ................ 8800955

[51] Int. Cl.$^5$ .............................................. B32B 3/02

[52] U.S. Cl. ........................................ 428/64; 428/65; 428/913; 369/288; 430/945; 346/76 L; 346/135.1

[58] Field of Search ................ 428/64, 65, 913, 457; 369/288; 430/945; 346/76 L, 135.1; 427/162

[56] References Cited

U.S. PATENT DOCUMENTS

| | | | |
|---|---|---|---|
| 4,647,944 | 3/1987 | Gravesteijn et al. | 346/76 L |
| 4,719,594 | 1/1988 | Young et al. | 430/945 |
| 4,803,660 | 2/1989 | Kobayashi et al. | 369/284 |

Primary Examiner—Patrick J. Ryan
Attorney, Agent, or Firm—Norman N. Spain

[57] ABSTRACT

A laminated product comprising substrate (7) and a thin layer (11, 12) of a dielectric compound formed from the oxide or the suboxide of gallium antimonide or indium antimonide, an optical information carrier containing such a thin layer, whereby said thin layer, dependent upon the oxygen content, may function as a recording layer 11 or as a transparent distance layer 12, as well as the suboxide of gallium antimonide or indium antimonide used in the laminated product.

8 Claims, 2 Drawing Sheets

LAMINATED PRODUCT, COMPOUND USED IN THE LAMINATED PRODUCT AND OPTICAL INFORMATION CARRIER PROVIDED WITH THE LAMINATED PRODUCT

This is a continuation of application Ser. No. 283,415, filed Dec. 12, 1988, abandoned.

The invention relates to a laminated product of a substrate and a thin layer of an inorganic dielectric compound.

Such laminated products are used on a large scale and in various technical fields, for example, in displays in which transparent electrodes of, for example, $SnO_2$ are covered with a thin inorganic dielectric layer. Another field of application is formed by the optical components in which, for example, substrates of synthetic resin or glass such as lens bodies, mirrors and the like are covered with a hard layer of an inorganic dielectric compound. A very important field of application is formed by the optical information carriers such as Compact Discs (T.M.), laser vision (T.M.) discs or optical recording elements for the optical recording and reading of information. Thin inorganic dielectric layers are used in such information carriers as, for example, so-called tuning layers. This relates to multilayer systems, in particular three-layer systems, in which an absorption layer (recording layer) is separated from a reflection layer by means of an intermediate layer of an inorganic dielectric. Layers of an inorganic dielectric are also used as hard, inert coating layers of the optical structure or the recording layer of optical information carriers.

In all these applications a dielectric thin layer of $SiO_2$ (quartz) is often used. A layer of a metal nitride such as aluminium nitride or silicon nitride is alternatively used, for example, as a tuning and/or protective layer in magnetooptical recording elements.

A disadvantages of all known dielectric inorganic layers is that they can only be used in a limited thickness. The reason for this is that by means of a sputtering process the layers can only be manufactured in limited thicknesses. For example, if $SiO_2$ is used a maximum thickness of approximately 0.5 $\mu m$ is possible. If the sputtering process is continued the $SiO_2$ layer will come loose from the substrate. A further disadvantage is that $O_2$ release takes place to some extent, causing $O_2$-sensitive substrates or further coating layers to be attacked. If a nitride layer is used the disadvantage of a limited thickness applies just the same. Owing to the limited thickness the use of the layer as a distance layer in, for example, multilayer optical recording systems is possible only to a limited extent. A nitride layer such as a layer of AlN further has the disadvantage that a crackled structure having very small hair cracks develops readily.

It is an object of the invention to provide a laminated product as defined in the opening paragraph, which does not possess the above-mentioned disadvantages. This is achieved in accordance with the invention by means of a laminated product of the above mentioned type which is characterized in that the dielectric compound is the oxide or suboxide of gallium antimonide or indium antimonide.

Suboxide is to be understood to mean herein an oxide whose atomic percentage of $O_2$ is less than the maximum atomic percentage of $O_2$.

The complete oxide of gallium antimonide and indium antimonide can be represented by the formula $$RSbO_4 \qquad (1)$$

wherein R is the element Ga or In.

The suboxide can be represented by the formula $$RSbO_p \qquad (2)$$

wherein R is the element Ga or In, and p has a value smaller than 4 and larger than 0.

The invention relates more in particular to a laminated product of the above-mentioned type in which the dielectric compound is a suboxide of gallium antimonide or indium antimonide, which satisfies the formula $$[R_q Sb_{1-q}]_x O_{1-x} \qquad (3)$$

wherein
R is the element Ga or In,
q has a value of 45–55 at. % and
x has a value of 33–99 at. %.

A layer of the above-stated formula (1), (2) or (3) adheres very well to all kinds of substrates such as metals, semiconductors, glass and synthetic resin. Moreover, other layers, such as metal layers, can also be adherently applied to a layer of the compound of the formula (1), (2) or (3). It has been found that by means of a sputtering process the layer can be applied in extremely large thicknesses of, for example 6 $\mu m$ or more. Even then the layer still has a perfect structure without hair cracks. It has been established that the oxygen atoms are incorporated in the R-Sb crystal lattice. Consequently, no $O_2$ release can occur. The layer is completely inert.

In a preferred embodiment, the layer of the compound of the formula (1), (2) or (3) is provided by means of a vapour deposition process or a sputtering process and has a thickness up to approximately 10 $\mu m$.

The invention also relates to a compound of the formula $[R_q Sb_{1-q}]_x O_{1-x}$ wherein R, q and x the above-stated meanings.

The new compound in accordance with the invention is a sub-oxide of $R_q Sb_{1-q}$ which will hereinafter also be referred to as the suboxide of gallium antimonide or the suboxide of indium antimonide.

The new substance is a chemically very stable compound. The oxygen atoms are firmly fixed in the crystal lattice of gallium antimonide or indium antimonide. No oxygen diffusion takes place. Also in the case of compounds of the above-stated formula wherein x has a high value and, consequently, the compound has a very low oxygen content, no or a negligibly small oxygen uptake occurs. The oxygen-containing upper molecular layers of a layer of the new compound prevent a further oxygen uptake or penetration of oxygen.

The new compound in accordance with the above-stated formula is manufactured from the composing elements by means of a vapour deposition process or a sputtering process which is carried out in an inert gas atmosphere containing of from 3–50 vol. % of oxygen. A suitable inert gas is, for example, argon. The partial gas pressure of argon is, for example, $10^{-3}$ mbar. The oxygen partial pressure is, for example, from $5.10^{-5}$ to $8.10^{-4}$ mbar.

The invention also relates to an optical information carrier which is characterized in that it contains a laminated product as described hereinbefore.

In a suitable embodiment the optical information carrier in accordance with the invention contains a substrate which is provided on one side with an optical recording layer which is formed from a compound of the formula $$[R_q Sb_{1-q}]_y O_{1-y} \qquad (4)$$

wherein R and q have the above-stated meanings and y has a value from 80-99 at. %.

In connection with this embodiment reference is made to U.S. Pat. No. 4,646,944 from which an optical recording element is known which contains a recording layer of GaSb or InSb. The recording layer is applied to a substrate of, for example, synthetic resin or glass by means of, for example, a sputtering process. On exposure to laser light which is pulsated in accordance with the information to be recorded, crystalline information bits are formed in the amorphous recording layer. The bits are read on the basis of reflection differences with the environment by means of a continuous low-intensity laser beam.

Applicants have established by means of experiments that the results obtained with the known recording layer of, for example, GaSb depend on the composition and quality of the target used during sputtering the layer. For example, it has been found that the differences, which are determined by measuring the signal/noise ratio of information bits, are of the order of 5-10 dB. The transmission of a layer of GaSb having a constant thickness was found to fluctuate dependent upon the target used. For example, it has been found that a compressed target of $Ga_{50}Sb_{50}$ has a transmission of 5%, whereas a cast target of $Ga_{50}Sb_{50}$ having the same layer thickness has a transmission of 2%.

If a recording layer in accordance with the invention is used, which corresponds to formula (2), the above-mentioned variations do not occur. Reproducible results are obtained which are independent of the target used for the manufacture of the layer. A possible explanation may be that on exposure to laser light the oxygen-containing amorphous recording layer in accordance with the invention crystallizes "explosively" from numerous nuclei. After the short explosive crystallization no further crystallisation takes place. The known GaSb layer exhibits a rapid and unrestrained crystallization which is maintained by the crystallization energy released. Consequently, the addition of $O_2$ sort of quenches the further crystallization. In the initial stage of the crystallization of an exposed spot in the amorphous recording layer in accordance with the invention, a plurality of nuclei is formed from which crystallization takes place. It is assumed that the presence of $O_2$ in the recording layer in accordance with the invention enhances nucleation.

The recording layer of formula (4) is manufactured by means of a sputtering process in which a target is used having the desired nominal composition, and in which 3-15% by vol. of oxygen is added to the inert sputtering gas. A suitable inert sputtering gas is, for example, argon. It is to be noted that the determination of the value of y in formula (4)—and this also applies to the value of x in formula (3)—is difficult. The results obtained depend to some extent on the measuring method selected. A method which is commonly used for this type of determination is the Rutherford backscattering method. The stated values of y and x are determined by the said method.

Consequently, the analysis of the recording layer in accordance with the invention is somewhat problematic. The layer can best be defined by means of the preparation method in which, as stated above, the recording layer is obtained by means of a sputtering process in which a substance of the formula $R_q Sb_{1-q}$ is used as a target, wherein R and q have the above-stated meanings, and in which an inert sputtering gas is used to which 3-15% by vol. of oxygen is added. The final pressure used in the sputtering process may vary within wide limits and is, for example, of from $5.10^{-5}$ to $10^{-8}$ mbar. The energy required for the sputtering process may also vary within wide limits, such as, from 100 W to 1000 W. Preferably, the sputtering process is a DC magnetron sputtering process which, if desired, is carried out at a raised temperature of, for example, 50°-100° C. However, the temperature sensitivity of the substrate used has to be taken into account.

In a further suitable embodiment of the optical information carrier in accordance with the invention the substrate is provided on one side with a first layer comprising an optical structure, which first layer is covered with a thin second layer of a compound of formula (1) or (2).

The second layer comprises more in particular a compound of the formula $$[R_q Sb_{1-q}]_z O_{1-z} \qquad (5)$$

wherein R and q have the above-stated meanings and z has a value of from 33-80 at. %.

The optical structure of the first layer is, for example, an optically readable phase structure comprising an information track of information areas which are alternately located at a higher and a lower level, such as, for example, used in Compact Discs (T.M.). The layer having the optical structure may also be a recording layer for optically recording and reading information. The bits recorded in the recording layer may be crystalline areas in an amorphous matrix, as described above. It is also possible that cavities are formed in the exposed parts of the recording layer, or, for example, raised portions in the form of bulges. The layer having the optical structure may further be a magneto-optical layer in which the direction of magnetisation is reversed in the exposed parts by means of a magnetic field. These areas are read by means of low-intensity, polarized laser light, utilising the Kerr or Faraday rotation.

The thin layer of the compound of formula (1), (2) or (5) ensures that the optical structure is perfectly sealed. The layer is inert, adheres well and can be applied by means of a sputtering process up to a thickness of approximately 10 μm. No hair cracks are formed.

The layer of formula (5) has an average oxygen content which is substantially higher, than that of the recording layer of formula (4) described above. The layer of the compound of formula (5) has a transparency such that the layer is unsuitable or substantially less suitable for use as a recording layer. As the value of the index z is lower, the transparency character of the layer is higher. Preferably, a completely transparent layer is used as a coating layer.

In common with the compounds of the formulae (3) and (4) it is difficult to determine the oxygen content of the compound of formula (5). The indicated values of z are determined by means of the Rutherford backscattering method.

The layer of the compound of formula (5) is obtained by means of a sputtering process in which a substance of the formula $R_qSb_{1-q}$ is used as a target, wherein R and q have the above-mentioned meanings, and in which an inert sputtering gas is used to which 15–50 vol. % of oxygen is added.

Also in this case the final pressure used in the sputtering process may vary within wide limits. The sputtering process is carried out in the same manner as described above with respect to the manufacture of a layer of a compound of formula (4).

In a further favourable embodiment of the optical information carrier in accordance with the invention, the above-mentioned first layer which is provided with an optical structure, is an optical recording layer formed from a compound of formula (4).

Thus, in this embodiment a recording layer of formula (4) is covered with a coating layer of formula (5).

In a special embodiment, the optical information carrier contains a multilayer anti-reflex recording system which comprises, in succession, an amorphous recording layer of a compound of formula (4), a dielectric layer of a compound of formula (5) and a reflective layer. The reflective layer may consist of a dye. Preferably, a metal layer, and, in particular, an Al layer, an Ag layer or an Au layer is used.

The above-mentioned three-layer system can be tuned, i.e. the optical path length can be influenced such that an anti-reflex state is obtained, by the choice of the thickness of the dielectric layer. In this situation, the reflective beams emanating from each layer extinguish one another on the basis of phase differences. The anti-reflex state does not exist at the location of a crystalline information bit in the recording layer. It may also be the other way round, namely, that the anti-reflex state exists at the location of an information bit, and that there is no anti-reflex state in the surroundings of the bit. The signal/noise ratio is improved in such a multilayer system.

In a preferred embodiment of the optical information carrier in accordance with the invention, which is interesting from a practical point of view, a plurality of thin layers is provided on the substrate which comprise alternately a compound of formula (4) and a compound of formula (5).

The layers having the compound of formula (4) are optical recording layers. The layers are amorphous. Crystalline information bits are formed by exposure to laser light. The layers of the compound of formula (5) located between the recording layers are inert, transparent distance layers which can be applied by means of a sputtering process in any desired thickness up to 10 μm. The thickness is selected so that two successive recording layers are not both within the depth of focus of the objective focusing the write laser beam or the read laser beam on one of the two recording layers. As a result of this, cross-talk and the like is prevented.

Owing to the plurality of recording layers, the amount of information which can be stored is very high in this special embodiment. A further interesting advantage is that this multilayer system can be manufactured in a very efficient and readily conceivable manner. The manufacture is carried out by means of a sputtering process in which use is made of a target having the composition $R_qSb_{1-q}$, and in which the sputtering gas contains an inert gas to which is alternately added a small quantity of oxygen of 3–15 vol. %, and preferably 5–10 vol. %, to obtain a recording layer of formula (4), and subsequently a larger quantity of oxygen of from 15–50 vol. % to obtain an inert, transparent distance layer of a compound of formula (5).

The invention will now be explained in more detail by means of an exemplary embodiment and with reference to the drawing, in which.

BRIEF DESCRIPTION OF THE DRAWINGS

In FIG. 1, reference numeral 1 denotes a lens body of polymethyl methacrylate which can be mounted in a holder 2. A refractive surface 3 of the lens body 1 is spherically shaped. The optical axis is indicated by reference numeral 4. The refractive surface is provided in accordance with the invention with an inert transparent layer 5 of an inorganic dielectric compound of the formula $GaSbO_4$. Layer 5 has a thickness of 5 μm.

Figure 4:
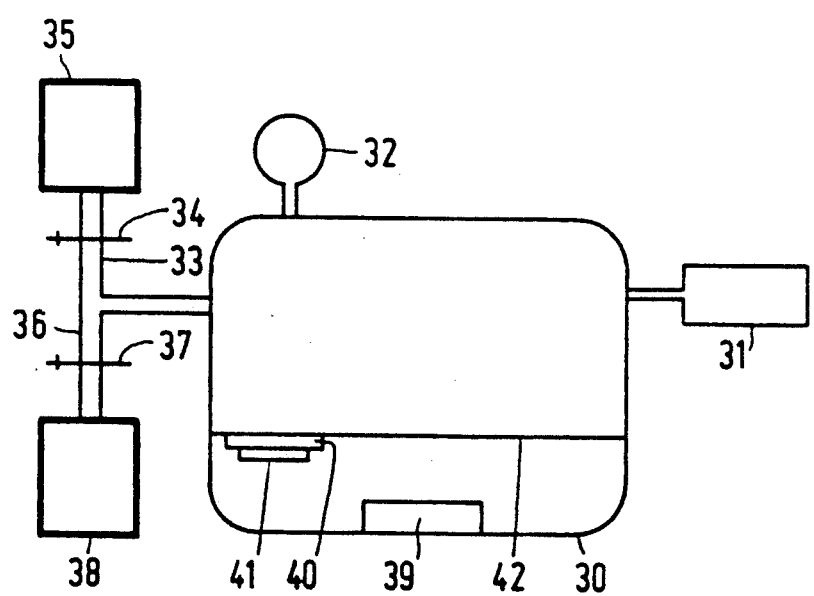
FIG. 4 is a diagrammatic view of a device for carrying out a sputtering process which is used in the manufacture of a laminated product in accordance with the invention.

Layer 5 is applied to refractive surface 3 by means of a sputtering process. The sputtering process is illustrated by means of FIG. 4. In a vacuum bell 30 of a magnetron which is not shown. the desired final pressure of $5.10^{-6}$ mbar is first adjusted by means of a vacuum pump 31. The pressure obtained is read from a manometer 32. Subsequently, oxygen from a reservoir 35 is supplied to the vacuum bell 30 via a supply pipe 33 and an opened stop valve 34 until a pressure of $8.10^{-4}$ mbar is obtained. The stop valve 34 is then closed. Subsequently, argon is led from a reservoir 38 to the vacuum bell 30 via a pipe 36 and an opened stop valve 37 until a pressure of $10^{-3}$ mbar is obtained. A target 39 of GaSb to which a voltage of 500 V is applied is present in the vacuum bell 30. A holder 40 for holding a substrate 41 is also present in the vacuum bell 30. Holder 40 and substrate 41 can be moved by the vacuum bell along a path 42. The magnetron is adjusted to a power of 200 W. The plasma has stabilized after 1 minute. When the substrate 41, such as for example the lens body 1, is led past the target 39 a layer of $GaSbO_4$ is deposited on the surface of substrate 41. This operation is repeated until the desired thickness of the sputtered layer of $GaSbO_4$ is obtained.

The layer obtained is a hard, inert, transparent coating which does not have faults such as hair cracks. If desired, other layers can be applied to layer 5, such as, for example, an annular metal layer 6 which is applied at the edge of the spherical surface by means of vapour deposition and which forms, for example, a diaphragm.

Figure 1:
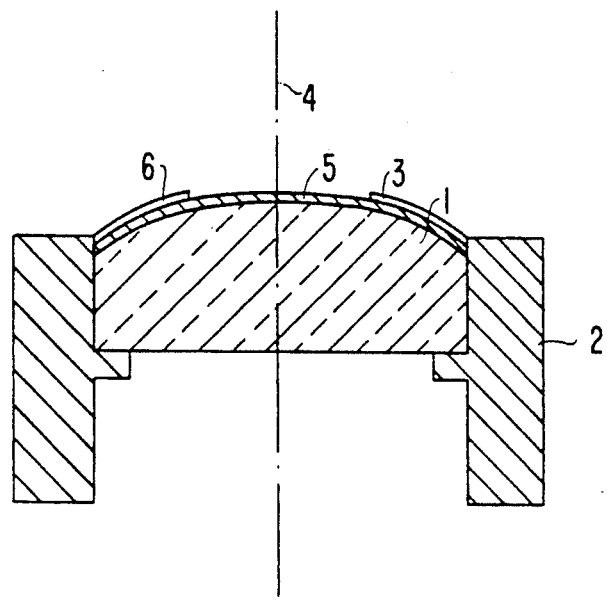
FIG. 1 is a cross-sectional view of a laminated product in accordance with the invention.
Figure 2:
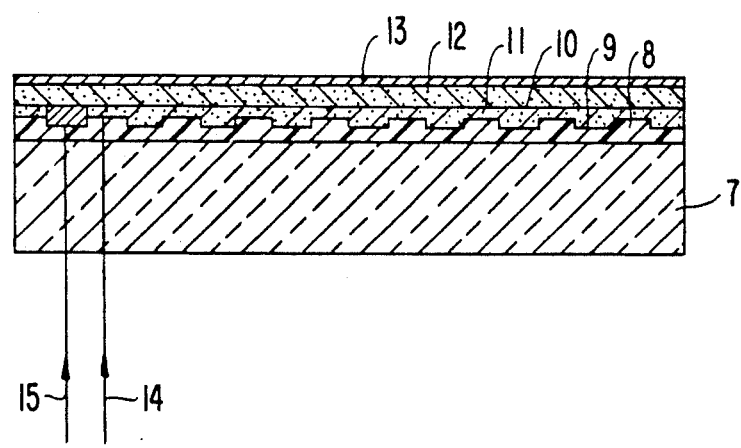
FIG. 2 is a cross-sectional view of an optical information carrier in accordance with the invention.

In FIG. 2, reference numeral 7 denotes a glass substrate plate which is provided on one side with a cured synthetic resin layer 8 of acrylate or methacrylate in which an optically readable follower track in the form of a spiral-shaped groove 9 is formed. Raised portions 10 between the groove portions 9 are called lands or land parts. In one sputtering operation a recording layer 11 of a compound of formula (4) and a transparent distance layer 12 of a compound of formula (5) are successively provided on layer 8. In both formulae R represents the element Ga. q has a value of 0.5, the value of y is 95 at. % and the value of z is 40 at. %.

The layers 11 and 12 are sputtered in the same manner as described above with respect to layer 5. The sputtering process is carried out in the sputtering arrangement shown in FIG. 4. For the sputtering of layer 11 an argon pressure of $1.10^{-3}$ mbar and an oxygen pressure of $8.10^{-5}$ mbar is used. For layer 12 an equally high argon pressure of $1.10^{-3}$ mbar and an oxygen pressure of $7.10^{-4}$ mbar are used. The sputtering target has the composition GaSb. The sputtering temperature is 50° C.

A metal layer 13 is applied to layer 12 by means of a vapour deposition process. This layer may be provided with a lacquer layer which is not shown.

During operation of the information carrier 7-13 a continuous, low-intensity laser beam 14 is focused on the land part 10 of the groove structure via the substrate plate 7. At the location of the land part there is no anti-reflex state so that sufficient light is reflected to detect the follower track formed by the land. The laser beam 14 follows the track on the basis of phase differences between reflected light emanating from the land part and from the surrounding groove portion.

Laser beam 14 is coupled to a write laser beam 15 in such a way that beam 15 is moved relative to beam 14 in a radial direction relative to the information carrier, for example, over a distance equal to half the combined width of the land and the groove. Thus, beam 15 is focused to the near groove as is shown in the drawing. At the location of the groove portion the information carrier 7-13 is in the anti-reflex state so that no or little light is reflected. Due to this, an optimum light absorption becomes possible which enhances the recording process. Laser beam 15 is modulated in conformity with the information to be recorded. A conversion of the recording material from the amorphous state into the crystalline state takes place in the exposed areas of the recording layer 11. Consequently, the information bits obtained are crystalline spots in an amorphous matrix. The anti-reflex state does not apply to the crystalline bits recorded in groove 9 because the refractive index of the crystalline material differs from that of the amorphous material so that at the location of a crystalline bit the optical path length does not concord with the anti-reflex state which is calculated for and imposed on the amorphous material at the location o the groove. Groove 9 which is provided with bits is scanned by a continuous, low-intensity read laser beam which is not shown in the drawing. At the location of the bits a reflection signal is measured by means of which the information recorded becomes available again.

Owing to the anti-reflex state of the amorphous material in the groove, the signal-noise ratio is high when the information recorded is read and amounts to, for example, 55 dB or even more.

Figure 3:
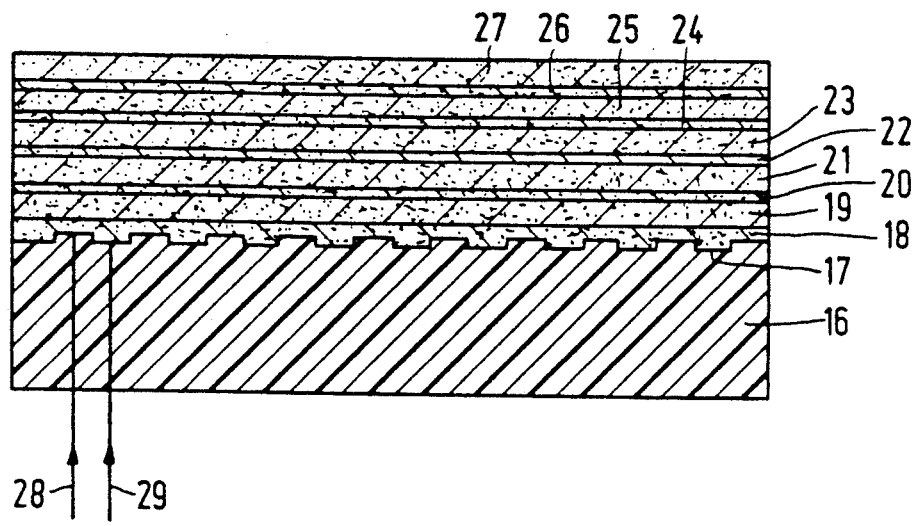
FIG. 3 is a cross-sectional view of another preferred embodiment of an optical information carrier in accordance with the invention.

In FIG. 3, reference numeral 16 denotes a substrate plate which is made of polycarbonate and which is provided on one side with a spiral-shaped groove 17. Groove 17 forms a follower track by means of which the write process is controlled in exactly the same manner as described with respect to FIG. 2. Substrate 16 is provided with ten thin layers (18-27) of alternately a recording layer (18, 20, 22, 24, 26) and a transparent distance layer (19, 21, 23, 25, 27). Each recording layer is made of a compound of formula (4); each distance layer is made of a compound of formula (5). In both formulae R stands for the element Ga and q has a value of 0.5. In formula (4) the index y has a value of 97 at. %. In formula (5) z has a value of 35 at. %. All layers are manufactured in one operation by means of sputtering. To this end, an argon pressure of $1.10^{-3}$ mbar and an oxygen pressure of $7.10^{-5}$ mbar is applied in the sputtering bell in accordance with FIG. 4. A recording layer was manufactured under these conditions. A distance layer was formed by temporarily raising the oxygen pressure to $8.10^{-4}$ mbar. By alternately raising the oxygen pressure to a relatively high value ($8.10^{-4}$ mbar) and reducing it to a relatively low value ($9.10^{-5}$ mbar) a layer structure as shown in FIG. 3 was obtained.

Reading and recording the information takes place in the same manner as described with respect to FIG. 2, although there is no anti-reflex state in the information carrier of FIG. 3. A modulated laser beam 29 is used for the recording process, which beam is focused to one of five recording layers. Laser beam 29 is controlled by a follower beam 28. A conversion from amorphous into crystalline occurs in the places of the recording layer exposed to beam 29. The crystalline information bits are read on the basis of reflection differences with the amorphous environment by means of a continuous read beam, not shown, which is focused to the relevant recording layer. By changing the depth of focal distance of the lens used to focus the beams information can be recorded or read on each recording layer. The thickness of the distance layer is selected so that the next recording layer is outside the depth of focus.

What is claimed is:

1. A laminated product provided with a substrate and a thin layer of an inorganic dielectric compound, characterized in that the dielectric compound is the suboxide of gallium antimonide or indium antimonide, which corresponds to the formula

 (3)

wherein R represents the element gallium or indium, q has a value of 45-55 at. % and x has a value of 33-99 at. %.

2. A laminated product as claimed in claim 1, characterized in that the layer of the compound of formula (3) is applied to the substrate by means of a vapour deposition process or a sputtering process and has a thickness up to approximately 10 μm.

3. A compound of the formula

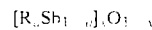

wherein R is the element Ga or In, q has a value of 45-55 at. % and x has a value of 33-99 at. %.

4. An optical information carrier provided with a laminated product as claimed in claim 1.

5. An optical information carrier as claimed in claim 4, characterized in that the information carrier comprises a substrate which is provided on one side with an optical recording layer which is formed from a compound which satisfies the formula

 (4)

wherein R and q have the above-stated meanings and y has a value of from 80-99 at. %.

6. An optical information carrier as claimed in claim 4, characterized in that the information carrier comprises a substrate which is provided on one side with a first layer having an optically readable structure, which first layer is coated with a thin second layer of a compound of the formula $$[R_qSb_{1-q}]_zO_{1-z} \quad (5)$$

wherein R R represents the element gallium or indium and q has a value of 45-55 at. % and z has a value of from 33-80 at. %.

7. An optical information carrier as claimed in claim 6, characterized in that the first layer is an optical recording layer which is formed from a compound of the formula $$[R_qSb_{1-q}]_yO_{1-y} \quad (4)$$

wherein R represents the element gallium or indium, q has a value of 45-55 at. % and y has a value of 80-99 at. %.

8. An optical information carrier, said information carrier comprising a substrate provided on one side with a layer having an optically readable structure which optically readable structure is coated with a plurality of thin layers, said layers alternating between layers of the suboxide of gallium antimonide and of indium antimonide corresponding to the formula $[R_qSb_{1-q}]_xO_{1-x}$ wherein R represents the element gallium or indium, q has a value of 5-55 at. % and x has a value of 33-99 at. % and recording layers formed from a compound of the formula $[R_qSb_{1-q}]_zO_{1-y}$ wherein R represents the element gallium or indium, q has a value of 45-55 at. % and y has a value of 80-99 at. %, said layer provided with the optically readable structure being situated directly on said substrate.

* * * * *